Nov. 6, 1956 — E. M. TISCHER — 2,769,548
LIQUID FILTER
Filed April 29, 1952
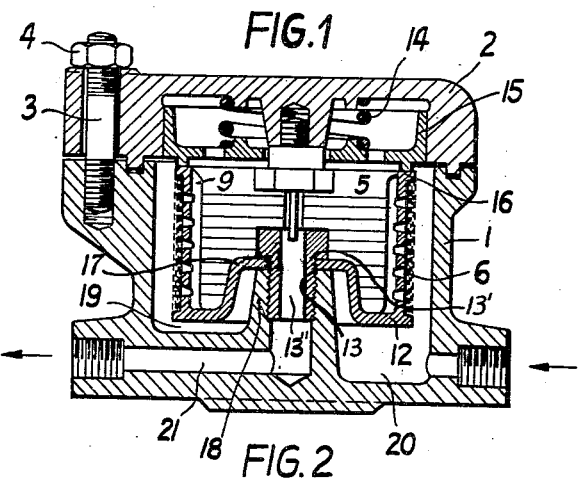
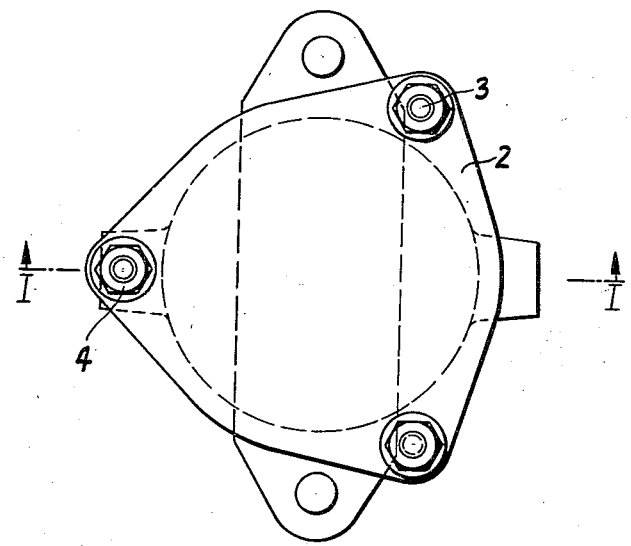
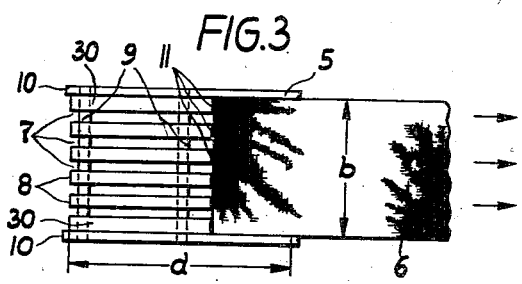
INVENTOR.
E. M. Tischer
BY
ATTYS.

United States Patent Office 2,769,548
Patented Nov. 6, 1956

2,769,548

LIQUID FILTER

Ernst Max Tischer, Augsburg, Germany

Application April 29, 1952, Serial No. 284,942

Claims priority, application Germany March 3, 1952

7 Claims. (Cl. 210—164)

This invention relates to a liquid filter having a plurality of sieve or screen filters superimposed on one another, which is intended and is more especially suitable for very fine filtering operations. Very fine filtering operations are necessary for very many different purposes, for instance in the filtering of engine fuels and also in the chemical industry, for instance for the filtering of acids, untreated water and the like. In very fine filtering, solid particles of a size exceeding 2 to $10\mu$ must be held back by the filter. For this purpose filter sieves having a very small mesh are necessary, which because of the extreme fineness of the wire are very difficult to manufacture and furthermore are of very little use in practice because of their excessive susceptibility to mechanical damage.

The invention is based on the idea of employing coarser sieves in a plurality of superimposed layers. In the liquid filter according to the invention the filters consist of a circular cylindrical drum provided with openings and a sieve or screen strip of wire fabric or other continuous liquid impervious filaments wound on to the drum in a plurality of turns, of which the width is so small, and which is wound on and attached under such tension, that the screen fabric layers are pressed one upon the other with uniform surface pressure at all points. Tests have shown that with a filter of this new type of construction very great fineness of filtering can be obtained when relatively coarse screens or sieves are used. For instance if the sieve or screen band is of a fineness of $100\mu$ (i. e. if the size of mesh is $\frac{1}{10}$ mm.) and if five turns of the sieve or screen strip are wound tightly on to a drum in accordance with the invention, this sieve strip coil gives a filtering fineness of about 5 to $10\mu$, i. e. all solid substances of a size greater than 5 to $10\mu$ are held back by the filter. The sieve strip coil thus produces fineness of filtering which is at least ten times that produced merely by the sieve strip.

Liquid filters having a plurality of superimposed sieve filters are of course known. But the arrangement thereof is such that the whole or part of the sieves is loose, or the sieves are disposed at intervals from one another, so that relatively great and uniform fineness of filtering cannot be obtained.

The invention is described in greater detail hereunder with reference to the accompanying drawings illustrating the embodiment chosen by way of example.

In these drawings,

Figure 1 is a vertical section through a liquid filter, on line I—I of Figure 2, Figure 2 is a plan view of the filter shown in Figure 1, Figure 3 is a view in elevation of a filter body drum together with a sieve strip of which the winding has been commenced.

Figures 1 and 2 illustrate a liquid filter of the kind used for instance for fuel filtering in internal combustion engines. 1 is the filter casing and 2 is a removable cover held by screw bolts 3 and nuts 4. In the casing 1 is arranged a filter body drum 5 on which a sieve strip 6 is provided which is wound on a plurality of superimposed turns. In the particularly advantageous embodiment illustrated, this drum 5 is provided with annular gaps 7 and the drum rings or bands 8 are held together by axial ribs 9 disposed on the inner circumference of the drum. This drum has the advantage of being easy to manufacture, since the annular gaps 7 can be cut out on a lathe leaving bands 8 between the gaps. Also, projecting flanges 10 are provided on the ends of this drum 5, the distance between these flanges corresponding to the width $b$ of the sieve strip, as shown in Figures 1 and 3, so that the sieve strip 6 can be satisfactorily wound on to the drum between these flanges. Furthermore, for lateral sealing of the sieve strip continuous cylindrical supporting surfaces 30 are provided at the top and bottom of the drum.

A fabric woven from metal wire or continuous, liquid impervious filaments made of a synthetic material, for instance polyamide filaments, is used as the sieve strip. Textile fabrics cannot be used for the new liquid filter because spun threads swell in liquid so that the mesh of the filter would be variable, and moreover fibrous particles would detach themselves from the fabric wound on the drum.

According to Figure 3 the sieve strip 6 consisting of wire fabric is initially fastened to the periphery of the drum by brazing or cementing at 11 and then wound on to the drum in a plurality of turns, under tension. This tension depends on the fineness of the sieve, and amounts to about one to three kilogrammes per centimetre of width of the sieve strip. The end of the sieve strip is likewise fastened to the second-last turn of the sieve strip by brazing or cementing, the tension being maintained during this operation. The cylindrical drum and the winding of the sieve strip under tension ensure that the sieve fabric layers lie one upon the other tightly and with uniform surface pressure at all points, so that no solid body can force its way through between the sieve strip layers and therefore great and uniform fineness of filtering is ensured.

In order to make certain that the sieve strip layers press on one another uniformly at all points, a relatively narrow sieve strip is used. The width $b$ of the sieve strip depends on the fineness of the wire fabric and also on the diameter $d$ of the drum. When the diameter of the drum is relatively small, i. e. about 40 mm. or less, the width $b$ may be made approximately equal to the diameter $d$ of the drum. However, when the diameter of the drum is larger, the width of the sieve strip is considerably less than the diameter of the drum.

In the embodiment according to Figure 1, the outlet for the filtered liquid is provided at 13 in the lower closed end 12 of the drum. This outlet passage 13 is formed in a surrounding surface 17 that seats on the discharge pipe or outlet branch 18. A tubular hold-down element 13' having a passage 13" therethrough secures the drum to the outlet branch. The flow through the filter casing is indicated by arrows. The upper open end of the drum is closed, by means of a cover loaded by a spring 14 and preferably formed as a differential piston 15, in such a manner that at a certain excess pressure, an annular gap is produced at 16, i. e. between the end of the filter body drum and the cover 15, which gap acts as a filter. Thus when the filter coil 6 is very badly fouled, part of the unfiltered liquid can pass through the filter gap 16. Tests have shown that even in the case of very fine filtering this annular gap still has the desired filtering effect, i. e. it holds back even fine solid bodies.

As is shown in Figure 1 and mentioned previously, the lower closed end wall 12 of the filter body drum bulges inwards and upwards at 17, and in the casing there is a discharge pipe 18 which projects freely upwards and on which the filter drum is supported. This construction has the advantage that when the filter body, that is, drum 5 with sieve strip 6 mounted thereon, is removed the filtration sediment which has fallen into the casing 1 is held back on the casing bottom at 19 and 20 and cannot get into the outlet duct 21.

The casing halves 25 and 26 are secured together by tubular bolts 31 and 32 screwed together at 35. For the sake of safety connections 34 to lock the two casing halves together are provided but are not essential to the device. It will be seen, therefore, that by unscrewing bolt 32 the bottom casing half 23 may be removed downwardly with the entire assemblage of filter elements 25–29.

I claim:

1. A liquid filter element for fine filtering, comprising a substantially cylindrical drum of a diameter at least equal to its axial length, a radially outwardly extending flange at each end of said drum, a plurality of annular gaps through the wall of said drum providing bands adjacent each flange and between the gaps, the width of gaps and bands being such that the area of the bands at least equals the gaps, a sieve strip woven of liquid-impervious filments, said strip being of a width equal to the distance between said flanges and having one end secured to said drum, said strip being wound a plurality of times about said drum under such tension as to create a substantial radial pressure in said strip against the drum, whereby the layers of said strip tightly engage against each other and against said bands with a substantial and uniform radial pressure at all points.

2. The filter element of claim 1 characterized by the sieve strip being of a mesh in the ratio of fineness compared with the designed effective fineness of the filter, of one to ten, said sieve strip being wound at least five complete turns about said drum.

3. The filter element of claim 1 in which the width of the gaps and the width of the bands between the gaps are equal.

4. A liquid filter for fine filtering, comprising substantially cylindrical drum means forming a plurality of substantially rigid parallel cylindrical bands separated from each other by annular gaps, a sieve strip woven of continuous liquid impervious filaments, said strip being wound around the drum in several superposed layers under tension, the width of each gap being a small fraction of the total width of the strip, whereby the said fabric layers tightly engage each other and the bands with substantially uniform surface pressure at all points radially toward said drum, and casing means accommodating said drum means and formed with an inlet and an outlet for the filtered liquid so disposed as to allow the flow to pass through the sieve strip from the outer to the inner side thereof.

5. A liquid filter for fine filtering, comprising substantially cylindrical drum means forming a plurality of substantially rigid parallel cylindrical bands separated from each other by annular gaps whose axial width is of the same magnitude as the axial width of the bands, and a sieve strip of a width to cover all of said gaps woven of continuous liquid impervious filaments, said strip being of a width not exceeding the diameter of the drum, said strip being wound under tension around the drum in several superposed layers whereby the said fabric layers tightly engage each other and the bands with substantially uniform surface pressure at all points.

6. A liquid filter for fine filtering comprising a casing, a cylindrical drum body fixed therein and forming a plurality of parallel cylindrical bands separated from each other by annular gaps, a sieve strip woven of continuous liquid impervious filaments, said strip being of a width not exceeding the diameter of the drum and being wound around the drum in several superposed layers under tension to eliminate wrinkles or corrugations, the width of the gaps being a small fraction of the total width of the strip, whereby the said fabric layers tightly engage each other and are supported by the bands and with substantially uniform surface pressure at all points, the drum body being closed at one end with the exception of an outlet for the filtered liquid and being open at its opposite end, a cylindrical cover for the open end of the cylindrical drum body, said cover having a larger diameter than the drum body and being slidably guided in a cylindrical bore of the casing, means for elastically forcing the cover to seat on the open end of the cylindrical drum body, and connection means for feeding the liquid to be filtered into the casing outside of the drum body under pressure, whereby at a certain excess liquid pressure between the outer and inner sides of the drum body the cover is lifted from its seat by liquid pressure to open a gap between the cover and the drum body, which gap is so small as to act as an auxiliary filter in case of clogging of the sieve strip layers.

7. A liquid filter for fine filtering, comprising a casing having an outlet branch projecting centrally into the cavity of the casing from the bottom thereof, a cylindrical drum body whose lower end is closed with the exception of a central outlet passage formed with a surface thereabout for face to face contact with the outlet branch of the casing, tubular means extending through said passage to rigidly clamp said drum to said outlet branch of the casing, a sieve strip woven of continuous, liquid impervious filaments, said sieve being of a width not substantially exceeding the diameter of the drum and said sieve being wound around the drum in several superposed layers under tension to eliminate folds or corrugations, the wall of the drum consisting of bands separated by annular gaps, the width of each gap being a small fraction of the total width of the sieve strip, whereby the said layers tightly engage each other and with substantially uniform radial surface pressure at all points, said casing means accommodating said drum means being formed with an inlet and an outlet for the liquid so disposed as to cause the normal flow of liquid to be filtered to pass through the sieve strip from the outer to the inner side thereof.

References Cited in the file of this patent

UNITED STATES PATENTS

| | | |
|---|---|---|
| 1,714,825 | Stephan | May 28, 1929 |
| 1,869,589 | Tischer | Aug. 2, 1932 |
| 1,912,235 | Winslow | May 30, 1933 |
| 2,082,322 | Brundage | June 11, 1937 |
| 2,134,061 | Thomas | Oct. 25, 1938 |
| 2,141,903 | Brundage | Dec. 27, 1938 |
| 2,173,978 | Pennebaker | Sept. 26, 1939 |
| 2,260,874 | Van Pelt | Oct. 28, 1941 |
| 2,272,583 | Reed | Feb. 10, 1942 |
| 2,341,097 | Heebink | Feb. 8, 1944 |
| 2,365,766 | Levier | Dec. 26, 1944 |
| 2,371,895 | Kingman | Mar. 20, 1945 |
| 2,374,756 | Kisch et al. | May 1, 1945 |
| 2,439,936 | Kasten | Apr. 20, 1948 |
| 2,563,786 | James | Aug. 7, 1951 |
| 2,575,900 | Vokes | Nov. 20, 1951 |
| 2,583,963 | O'Meara | Jan. 29, 1952 |
| 2,646,885 | James | July 28, 1953 |
| 2,711,828 | Webb et al. | June 28, 1955 |

FOREIGN PATENTS

| | | |
|---|---|---|
| 318,646 | France | Oct. 22, 1902 |
| 115,475 | Austria | Sept. 30, 1949 |